United States Patent
Shin et al.

(10) Patent No.: US 10,440,330 B2
(45) Date of Patent: Oct. 8, 2019

(54) SURVEILLANCE CAMERA

(71) Applicant: Hanwha Techwin Co., Ltd., Seongnam-si (KR)

(72) Inventors: Hyun-Soo Shin, Changwon (KR); Byung-Moon Jun, Changwon (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 680 days.

(21) Appl. No.: 13/766,853

(22) Filed: Feb. 14, 2013

(65) Prior Publication Data

US 2013/0215265 A1    Aug. 22, 2013

(30) Foreign Application Priority Data

Feb. 20, 2012    (KR) .................. 10-2012-0016720

(51) Int. Cl.
| | | |
|---|---|---|
| *H04N 7/18* | (2006.01) | |
| *H04N 5/225* | (2006.01) | |
| *G03B 17/12* | (2006.01) | |
| *G08B 13/196* | (2006.01) | |

(52) U.S. Cl.
CPC .............. *H04N 7/18* (2013.01); *G03B 17/12* (2013.01); *H04N 5/2252* (2013.01); *G08B 13/19619* (2013.01)

(58) Field of Classification Search
CPC ...... H04N 7/181; H04N 7/183; H04N 5/2252; H04N 5/2254
USPC ........................................................ 348/143
See application file for complete search history.

(56) References Cited

U.S. PATENT DOCUMENTS

| | | | | |
|---|---|---|---|---|
| 7,853,137 | B2* | 12/2010 | Yang ...................... | G03B 17/00 348/375 |
| 2006/0001986 | A1* | 1/2006 | Itohiya ................... | G02B 7/023 359/819 |
| 2008/0205881 | A1* | 8/2008 | Sakurai ................... | G02B 7/14 396/530 |

(Continued)

FOREIGN PATENT DOCUMENTS

| | | |
|---|---|---|
| JP | 2010197719 A | 9/2010 |
| JP | 2010263518 A | 11/2010 |

(Continued)

OTHER PUBLICATIONS

Communication dated Dec. 20, 2017, issued by the Korean Intellectual Property Office in counterpart Korean Patent Application No. 10-2012-0016720.

*Primary Examiner* — Jefferey F Harold
*Assistant Examiner* — Omer Khalid
(74) *Attorney, Agent, or Firm* — Sughrue Mion, PLLC

(57) ABSTRACT

Provided is a surveillance camera. The surveillance camera includes a main body casing; a front cover that forms a camera housing by being combined with the main body casing; a first protrusion unit that protrudes frontward of the front cover from a front surface of the front cover; a second protrusion unit that is formed on an outer edge of the first protrusion unit by being separated from the first protrusion unit; and a lens mounting unit that combines with the front cover, wherein the lens mounting unit comprises a first guide unit that protrudes toward the front cover and contacts the first protrusion unit and a second guide unit that contacts the second protrusion unit. Accordingly, tilting of the lens mounting unit is effectively prevented.

16 Claims, 3 Drawing Sheets

(56) References Cited

U.S. PATENT DOCUMENTS

2010/0321809 A1\* 12/2010 Fung .................... G03B 17/566
359/896

FOREIGN PATENT DOCUMENTS

| KR | 20-0166251 Y1 | 1/2000 |
| KR | 20030002284 A | 1/2003 |
| KR | 20030083977 A | 11/2003 |
| KR | 10-2010-0001079 A | 1/2010 |

\* cited by examiner

SURVEILLANCE CAMERA

CROSS-REFERENCE TO RELATED PATENT APPLICATION

This application claims the benefit of Korean Patent Application No. 10-2012-0016720, filed on Feb. 20, 2012, in the Korean Intellectual Property Office, the disclosure of which is incorporated herein in its entirety by reference.

BACKGROUND OF THE INVENTION

1. Field of the Invention

The present invention relates to a surveillance camera, and more particularly, to a mega pixel resolution surveillance camera that can prevent a partial image blurring phenomenon that occurs due to tilting of an image.

2. Description of the Related Art

Generally, a surveillance camera is installed in an arbitrary location for the purpose of preventing theft and accidents in advance. The surveillance camera includes a main body that includes an imaging device and a lens mounting unit having a lens unit. Recently, there is a trend toward mega-pixel resolution surveillance cameras, and thus, the horizontality between the lens mounting unit where the lens unit is mounted and an imaging surface is required to be precisely maintained.

Meanwhile, Korean Patent Publication No. 2007-0090148, "Focus Control Driving Device of Imaging Device for Camera" proposed a focus control driving unit. However, since a mega-pixel resolution camera has a resolution much higher than that of a conventional video graphics array (VGA) camera, an image blurring phenomenon may occur even if the horizontality of the imaging surface is tilted.

That is, for a camera that has a mega-pixel resolution or higher, if the horizontality between a lens mounting surface and an imaging surface is not maintained, a phenomenon that an image is partially focused may occur although a back focal length (BFL) is well focused.

SUMMARY OF THE INVENTION

The present invention provides a mega-pixel resolution surveillance camera that may prevent an image partial blurring phenomenon that occurs due to tilting of the mega-pixel resolution surveillance camera.

The present invention also provides a mega-pixel resolution surveillance camera in which a lens unit has various back focus lengths (BFLs).

According to an aspect of the present invention, there is provided a surveillance camera including: a main body casing; a front cover that forms a camera housing by combining with the main body casing; a first protrusion unit that protrudes frontward of the front cover from a front surface of the front cover; a second protrusion unit that is formed on an outer edge of the first protrusion unit by being separated from the first protrusion unit; and a lens mounting unit that combines with the front cover, wherein the lens mounting unit comprises a first guide unit that protrudes towards the front cover and contacts the first protrusion unit and a second guide unit that contacts the second protrusion unit.

An outer surface of the first guide unit may contact an inner surface of the first protrusion unit and an outer surface of the second guide unit may combine with an inner surface of the second protrusion unit.

The outer surface of the second guide unit and the inner surface of the first protrusion unit may include screw threads.

An elastic body may be located between the first protrusion unit and the second guide unit.

Upper surfaces of the screw threads formed on the outer surface of the second guide unit may contact lower surfaces of the screw threads formed on the inner surface of the second protrusion unit.

The first protrusion unit, the second protrusion unit, the first guide unit, and the second guide unit may be concentrically formed relative to each other.

The lens mounting unit may further include a control unit that protrudes towards the front cover from an outer edge of the lens mounting unit, and the control unit and the second guide unit may be concentrically formed relative to each other a concentric circle, wherein the control unit is formed on an outer edge of the second guide unit by being separated from the second guide unit.

The second guide unit may include a screw hole and a fixing lever is combined with the screw hole, wherein the fixing lever fixes the lens mounting unit by contacting an outer surface of the second protrusion unit.

The control unit may include a first stopper that extends toward the second protrusion unit on an edge thereof and the second protrusion unit may include a second stopper that extends toward the control unit on an edge thereof.

The lens unit may be combined with an inner surface of the first guide unit.

An image capturing unit may be located in the camera housing.

According to another aspect of the present invention, there is provided a surveillance camera including: a main body casing; a front cover that forms a camera housing by being combined with the main body casing; a lens mounting unit that combines with the front cover; and a lens unit that is combined with the lens mounting unit, wherein the lens mounting unit comprises a first guide unit to which the lens unit is combined and a second guide unit that is separated from the first guide unit and moves the lens mounting unit in an optical axis direction, and the front cover comprises a first protrusion unit that prevents the tilting of the lens mounting unit by contacting an outer surface of the first guide unit and a second protrusion unit that contacts the second guide unit.

Screw threads may be formed on surfaces where the second guide unit contacts the second protrusion unit.

The second guide unit may be formed on an outer edge of the first guide unit and an elastic body may be located between the first protrusion unit and the second guide unit.

Upper surfaces of the screw threads formed on the second guide unit may contact lower surfaces of the screw threads formed on the second protrusion unit.

A lubricant may be coated between the first guide unit and the first protrusion unit.

The first protrusion unit, the second protrusion unit, the first guide unit, and the second guide unit may be concentrically formed relative to each other.

The lens mounting unit may further include a control unit that protrudes toward the front cover from an outer edge of the lens mounting unit 120, wherein the control unit is formed on an outer edge of the second guide unit by being separated from the second guide unit.

The second guide unit may include a screw hole and a fixing lever may be combined with the screw hole, wherein the fixing lever fixes the lens mounting unit.

The control unit may include a first stopper that extends towards the second protrusion unit on an edge of the control unit and the second protrusion unit may include a second stopper that extends towards the control unit on an edge of the second protrusion unit.

According to the present invention, the horizontality between an image capturing surface of the image capturing unit and the lens unit is precisely maintained, and thus, the occurrence of tilting of the lens mounting unit may be prevented.

Also, a control section in which a focal length of the lens unit is controlled may be formed long, and thus, a lens unit having various focal lengths may be mounted.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings. This invention may be, however, be embodied in many different forms and should not be construed as being limited to the embodiments set forth herein. Rather, theses embodiments are provided so that this disclosure is thorough and complete and fully conveys the concept of the invention to those of ordinary skill in the art, and thus, the present invention will be defined by the spirit and scope of the claims. The terms used herein are for the purpose of describing particular embodiments only and are not intended to be limiting of the inventive concept. As used herein, the singular forms are intended to include the plural forms as well, unless the context clearly indicates otherwise. It will be further understood that the terms "comprise" and/or "comprising," when used in this specification, specify the presence of stated features, steps, operations, and/or components, but do not preclude the presence or addition of one or more other features, steps, operations, and/or components, and/or groups thereof. It will be understood that, although the terms first, second, third, etc., may be used herein to describe various elements, these elements should not be limited by these terms, and the terms are used for the purpose of distinguishing an element from another element.

Figure 1:
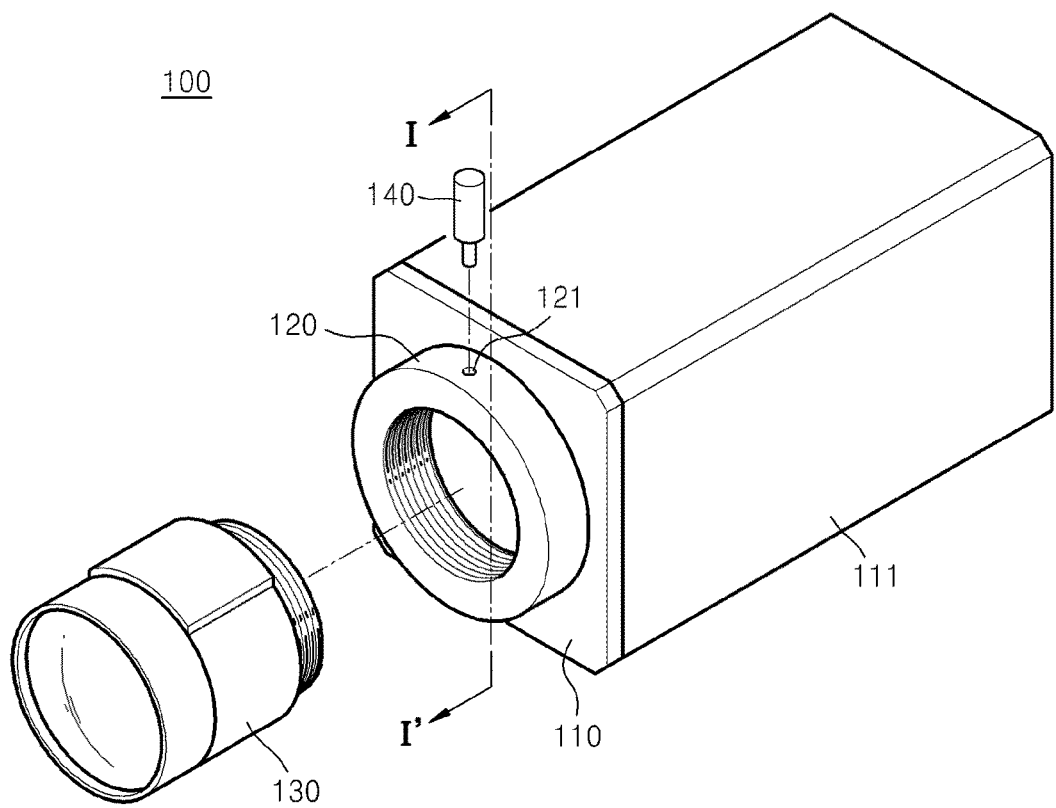
FIG. 1 is a perspective view of a surveillance camera according to an embodiment of the present invention.
Figure 2:
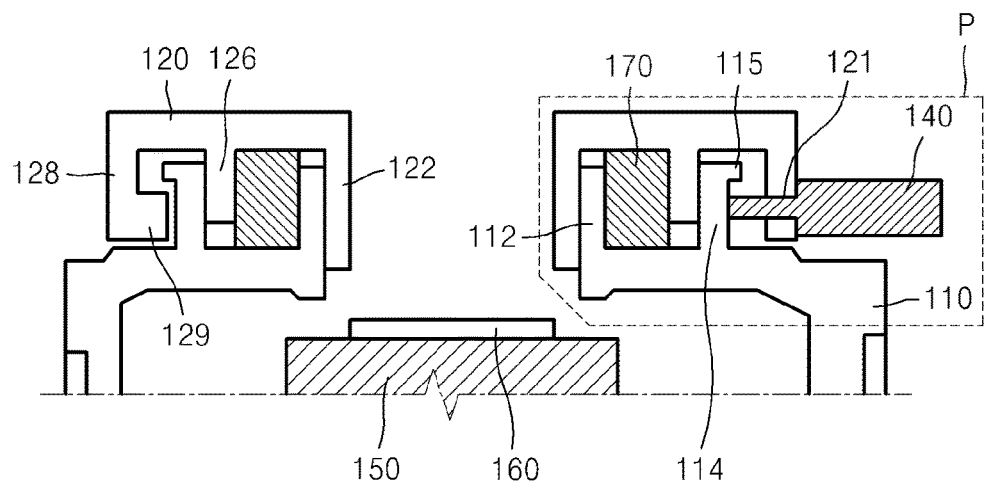
FIG. 2 is a cross-sectional view taken along a line I-I' of the surveillance camera of FIG. 1.
Figure 3:
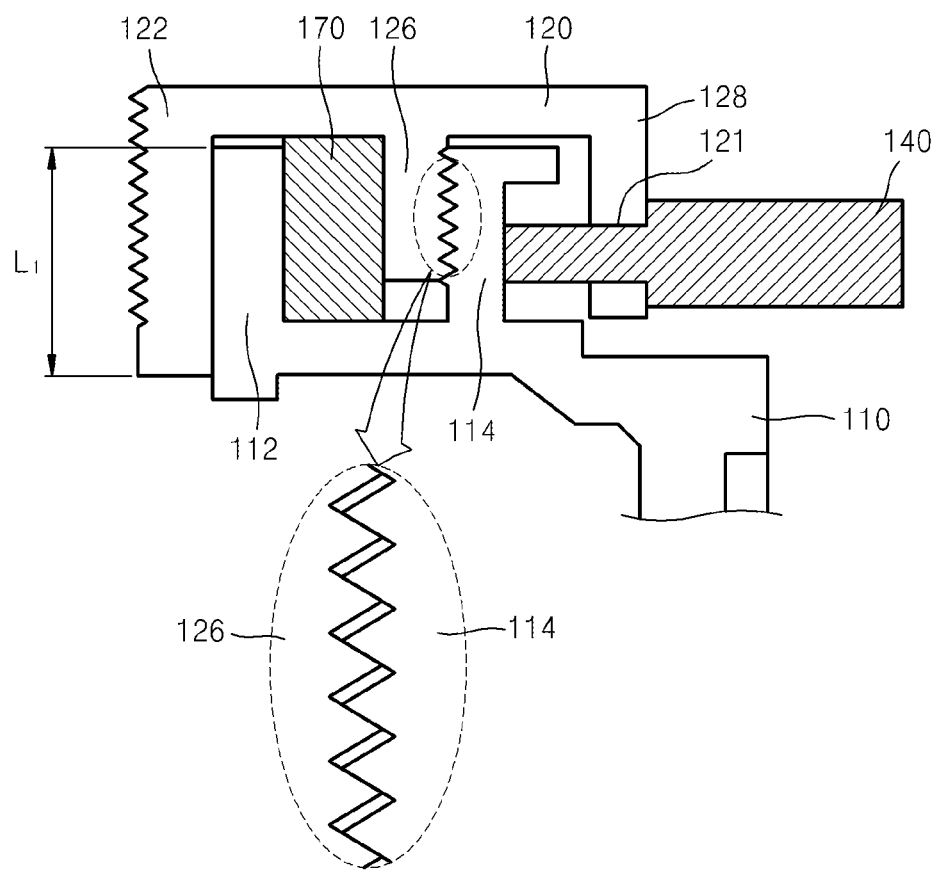
FIG. 3 is a magnified cross-sectional view of a portion P of FIG. 2.

FIG. 1 is a perspective view of surveillance camera 100 according to an embodiment of the present invention. FIG. 2 is a cross-sectional view taken along a line I-I' of the surveillance camera 100 of FIG. 1. FIG. 3 is a magnified cross-sectional view of a portion P of FIG. 2.

Referring to FIGS. 1 through 3, the surveillance camera 100 according to the current embodiment may include a main body casing 111 and a front cover 110 that forms a camera housing by being combined together, a lens mounting unit 120 that is combined with the front cover 110, and a lens unit 130 that is combined with the lens mounting unit 120.

A wiring substrate 150 and an image capturing unit 160 are mounted within the main body casing 111 and the front cover 110. The main body casing 111 and the front cover 110 are formed to block external light so that the image capturing unit 160 is not exposed to external light.

Although not shown, the wiring substrate 150 may be a substrate having a patterned wiring, for example, a printed circuit board (PCB). The image capturing unit 160 may be disposed on the wiring substrate 150, and the image capturing unit 160 is electrically connected to the wiring substrate 150.

The image capturing unit 160 takes pictures by transforming light, which enters through the lens unit 130, into an electrical signal. That is, the image capturing unit 160 may be a sensing device that performs photoelectric transformation of incident light, such as a charge coupled device (CCD) or a complementary metal oxide semiconductor (CMOS). Also, the image capturing unit 160 may have a resolution higher than a mega-pixel resolution.

Although not shown, a transparent cover (not shown) may be formed on the image capturing unit 160. The transparent cover may be combined with an upper surface of the image capturing unit 160 by using an adhesive. Thus, the image capturing unit 160 may be protected from external moisture and dust.

A first protrusion unit 112 and a second protrusion unit 114 that are formed on the front cover 110 protrude from a front surface of the front cover 110 towards a front side of the front cover 110. The first and second protrusion units 112 and 114 may be formed as one body with the front cover 110 by using an injection molding method, but are not limited thereto.

The first and second protrusion units 112 and 114 are concentrically formed relative to each other, and the second protrusion unit 114 is formed on an outer side of the first protrusion unit 112 and is separated by a predetermined distance from the first protrusion unit 112. More specifically, the first and second protrusion units 112 and 114 may form two circles having the same center but having radiuses that are different from each other, and the radius of the circle formed by the second protrusion unit 114 is greater than that of the circle formed by the first protrusion unit 112.

An opening according to the circle formed by the first protrusion unit 112 is formed in the front cover 110 that corresponds to an inner side of the first protrusion unit 112.

The lens mounting unit 120 includes a first guide unit 122 and a second guide unit 126 that are combined with the front cover 110 and protrude towards the front cover 110.

The first guide unit 122 and the second guide unit 126 are concentrically formed relative to each other, and the second guide unit 126 is formed on an outer side of the first guide unit 122 and separated by a predetermined distance from the first guide unit 122.

When the lens mounting unit 120 combines with the front cover 110, the first guide unit 122 contacts the first protrusion unit 112, and, at the same time, the second guide unit 126 is combined with the second protrusion unit 114.

For example, an outer surface of the first guide unit 122 and an inner surface of the first protrusion unit 112 have flat surfaces and contact each other, and an outer surface of the second guide unit 126 separated from the first guide unit 122 may contact an inner surface of the second protrusion unit 114. At this point, screw threads are respectively formed on the outer surface of the second guide unit 126 and the inner surface of the second protrusion unit 114 so that they may be combined with each other, and thus, when the second guide unit 126 rotates along the screw thread, the lens mounting unit 120 may move in an optical axis direction.

The lens unit 130 may be coupled to the lens mounting unit 120. For example, a screw thread may be formed on an inner surface of the first guide unit 122 so that the lens unit 130 may be coupled to the inner surface of the first guide unit 122.

In this way, since the lens unit 130 is coupled to the lens mounting unit 120, when the lens mounting unit 120 is combined with the front cover 110, a horizontal surface of the lens mounting unit 120 is necessarily kept perpendicular to an optical axis (of incident light?) by minimizing a tolerance between parts of the lens mounting unit 120 and the front cover 110.

If the horizontal surface of the lens mounting unit 120 is not kept perpendicular to the optical axis of the incident light, the horizontality between an image capturing surface of the image capturing unit 160 and the lens unit 130 combined with the lens mounting unit 120 may be difficult to precisely maintain, and in this case, in particular, when the image capturing unit 160 has a resolution higher than a mega-pixel resolution, although a back focus length (BFL) of the lens unit 130 is correctly focused, a partial image blurring phenomenon may occur.

However, according to the current embodiment, the second guide unit 126 is separated from the first guide unit 122, and thus, a portion L1 where the first guide unit 122 contacts the first protrusion unit 112 may be maximized. That is, when the front cover 110 is combined with the lens mounting unit 120, an inner area of the first protrusion unit 112 that supports the first guide unit 122 by contacting the first guide unit 122 may be maximized, and thus, the tilting of the lens mounting unit 120 may be minimized. Accordingly, the horizontality between the image capturing surface of the image capturing unit 160 and the lens unit 130 mounted on the lens mounting unit 120 may be maintained very precisely, and thus, although the image capturing unit 160 has a resolution higher than a mega pixel resolution, the occurrence of a partial image blurring phenomenon due to tilting may be prevented.

Also, since the second guide unit 126 is separated from the first guide unit 122, the screw thread formed on the second guide unit 126 may also be formed at a maximum length.

Accordingly, a focus control section, in which the BFL of the lens unit 130 can be controlled, is formed to be long, and thus, lens units having various focus lengths may be mounted on the surveillance camera 100 according to the current invention.

A lubricant may be coated between an outer surface of the first guide unit 122 and an inner surface of the first protrusion unit 112 that contacts the first guide unit 122. The lubricant may be semi-solid state grease.

The lubricant may be coated with a thickness of approximately 50 pm. In this way, when a lubricant is coated between the outer surface of the first guide unit 122 and the inner surface of the first protrusion unit 112, friction between the outer surface of the first guide unit 122 and the inner surface of the first protrusion unit 112 is reduced. Also, when a gap between the first guide unit 122 and the first protrusion unit 112 is filled with a lubricant, the tilting of the lens mounting unit 120 may be more effectively prevented.

Also, an elastic body 170 may further be located in a space between the first protrusion unit 112 and the second guide unit 126.

The elastic body 170 may be formed of a material capable of generating an elastic force for providing a force to push the lens mounting unit 120 towards the front side of the surveillance camera 100. The elastic body 170 may be formed of, for example, rubber, resin, or elastomer.

When a force is applied to the lens mounting unit 120 by the elastic body 170, as depicted in FIG. 3, upper surfaces of screw threads formed on an outer surface of the second guide unit 126 and lower surfaces of screw threads formed on an inner surface of the second protrusion unit 114 contact each other. Here, the upper surfaces of the screw threads denote, as depicted in FIG. 3, a surface of the screw thread formed on a single screw thread when the surveillance camera 100 is vertically placed so that a front side of the surveillance camera 100 faces upwards.

In this way, when the upper surfaces of the screw threads formed on an outer surface of the second guide unit 126 contact the lower surfaces of the screw threads formed on an inner surface of the second protrusion unit 114, a gap between the screw threads formed on the outer surface of the second guide unit 126 and screw threads formed on the inner surface of the second protrusion unit 114 is removed, and thus, the lens mounting unit 120 may be more strongly fixed (on the second protrusion unit 114?), and accordingly, the tilting of the lens mounting unit 120 may be more effectively prevented.

Referring to FIG. 3, the lens mounting unit 120 may include a control unit 128 that protrudes toward the front cover 110 from an outer edge of the lens mounting unit 120. The control unit 128 and the second guide unit 126 are concentrically formed relative to each other, and the control unit 128 is separately formed on an outer edge of the second guide unit 126.

The lens mounting unit 120 is rotated by the control unit 128, and the second guide unit 126 moves along the screw threads, and thus, the lens mounting unit 120 may move forward and backward. The control unit 128 may be formed as one body with the first guide unit 122 and the second guide unit 126 by using an injection molding method.

The control unit 128 may include a screw hole 121, and a fixing lever 140 may be combined with the screw hole 121. The fixing lever 140 may be coupled to the screw hole 121 by a screw method, and the fixing lever 140 may fix the lens mounting unit 120 by combining an edge unit of the fixing lever 140 with an outer surface of the second protrusion unit 114.

Also, a first stopper 129 that extends towards the second protrusion unit 114 may be formed on an edge of the control unit 128, and a second stopper 115 that extends towards the control unit 128 may be formed on an edge of the second protrusion unit 114. The first and second stoppers 129 and 115 are formed in a horizontal direction, and thus, may prevent the lens mounting unit 120 from separating from the front cover 110.

Figure 4:
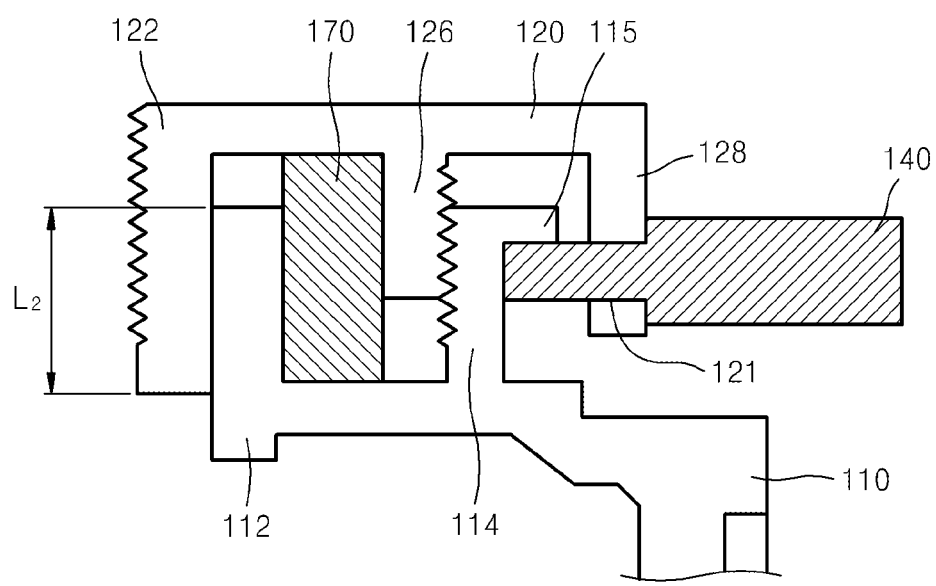
FIG. 4 is a magnified cross-sectional view of the portion P of FIG. 2.

FIG. 4 is a magnified cross-sectional view of the portion P of FIG. 2.

Also, FIG. 4 shows the portion P of FIG. 2 as depicted in FIG. 3. However, the lens mounting unit 120 is moved to a front side of the surveillance camera 100.

Referring to FIG. 4, a sequence of moving the front cover 110 and the lens mounting unit 120 will be described. First, the lens mounting unit 120 is rotated by using the control unit 128.

When the lens mounting unit 120 rotates, screw threads formed on an outer surface of the second guide unit 126 move along screw threads formed on an inner surface of the second protrusion unit 114. As a result, the lens mounting unit 120 may move forward along an optical axis while rotating.

When the lens mounting unit 120 moves along the optical axis, an outer surface of the first guide unit 122 maintains a contact state with an inner surface of the first protrusion unit 112, and thus, the tilting of the lens mounting unit 120 may be prevented.

In this way, when a BFL of the lens unit 130 (refer to FIG. 1) is adjusted by the movement of the lens mounting unit 120, the lens mounting unit 120 is fixed by using the fixing lever 140. The fixing lever 140, as described above, may be combined with the control unit 128 by being inserted into the screw hole 121, and may fix the lens mounting unit 120 by contacting an edge of the fixing lever 140 with the outer surface of the second protrusion unit 114.

The second stopper 115 that extends from the edge of the second protrusion unit 114 may limit a moving distance of the fixing lever 140 that moves along the second protrusion unit 114. That is, a maximum distance range in which the lens mounting unit 120 is able to move forward may be set by the second stopper 115. The maximum distance range may be determined in consideration of various BFLs of the lens unit 130 to be mounted. For example, the maximum distance range in which the lens mounting unit 120 may move forward may be in a range from about 1.2 mm to about 1.6 mm, but the present invention is not limited thereto.

In this way, when the lens mounting unit 120 moves forward, a vertical length from the first protrusion unit 112 to the first guide unit 122 is reduced from L1 (as depicted in FIGS. 3) to L2. However, for example, L1 of FIG. 3, that is, a maximum length in which the first guide unit 122 may contact the first protrusion unit 112, may be in a range from about 5 mm to 6 mm, and L2 of FIG. 4, that is, a length in which the first guide unit 122 may contact the first protrusion unit 112 when the lens mounting unit 120 moves forward at a maximum is a value obtained by deducting 1.2~1.6 mm from L1 of FIG. 3, wherein 1.2~1.6 mm is a maximum distance range the lens mounting unit 120 can move forward, and thus, L2 is maintained at more than 70% of L1. Accordingly, although the lens mounting unit 120 moves forward, the occurrence of tilting of the lens mounting unit 120 may be effectively prevented.

Also, the elastic body 170 located between the first protrusion unit 112 and the second guide unit 126 applies a force to the lens mounting unit 120. Therefore, the upper surfaces of screw threads formed on the outer surface of the second guide unit 126 may contact the lower surfaces of screw threads formed on an inner surface of the second protrusion unit 114. Accordingly, although the lens mounting unit 120 moves forward, a gap between the screw threads formed on the outer surface of the second guide unit 126 and the screw threads formed on the inner surface of the second protrusion unit 114 is removed, and thus, the tilting of the lens mounting unit 120 may be more effectively prevented.

Furthermore, a lubricant between the outer surface of the first guide unit 122 and the inner surface of the first protrusion unit 112 removes a gap between the first guide unit 122 and the first protrusion unit 112, and thus, the tilting of the lens mounting unit 120 may be more effectively prevented.

Accordingly, according to the present invention, a tolerance between parts of the lens mounting unit 120 and the front cover 110 may be minimized, and thus, the tilting of the lens mounting unit 120 may be effectively prevented. Accordingly, although the image capturing unit 160 has a resolution higher than a mega pixel resolution, a partial image blurring phenomenon that occurs due to tilting of the image may be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A surveillance camera comprising:
    a main body casing;
    a front cover that forms a camera housing by being combined with the main body casing;
    a lens mounting unit that combines with or detaches from the front cover by rotating the lens mounting unit with respect to the front cover, and combines with or detaches from a lens unit comprising a lens for the surveillance camera; and
    a fixing lever configured to fix the lens mounting unit,
    wherein the front cover comprises a first protrusion unit and a second protrusion unit that protrude frontward from a front surface of the front cover, the first protrusion unit and the second protrusion unit being concentrically formed on the front surface of the front cover without contacting each other,
    wherein the second protrusion unit is formed on an outer side of the first protrusion unit,
    wherein the lens mounting unit comprises a first guide unit and a second guide unit that protrude frontward from a rear surface of the lens mounting unit, the first guide unit contacting the first protrusion unit and the second guide unit contacting the second protrusion unit,
    wherein an inner surface of the first protrusion unit contacts an outer surface of the first guide unit such that an image blurring phenomenon caused by tilting of the lens mounting unit is prevented,
    wherein the first guide unit and the second guide unit are concentrically formed on the rear surface of the lens mounting unit without contacting each other,
    wherein the second guide unit is formed on an outer side of the first guide unit,
    wherein the front surface of the front cover and the rear surface of the lens mounting unit is disposed to face each other,
    wherein an outer surface of the second guide unit contacts an inner surface of the second protrusion unit by screw threads such that the lens mounting unit can be moved in an optical axis direction with respect to the front cover to adjust a back focus length (BFL), and
    wherein the fixing lever is configured to be screwed into a screw hole formed on the second guide unit such that the lens mounting unit is fixed by an end of the fixing lever pressing an outer surface of the second protrusion unit.

2. The surveillance camera of claim 1, wherein an elastic body is located between the first protrusion unit and the second guide unit.

3. The surveillance camera of claim 2, wherein upper surfaces of the screw threads formed on the outer surface of the second guide unit contact lower surfaces of the screw threads formed on the inner surface of the second protrusion unit.

4. The surveillance camera of claim 1, wherein the first protrusion unit, the second protrusion unit, the first guide unit, and the second guide unit are concentrically formed relative to each other.

5. The surveillance camera of claim 4, wherein the lens mounting unit further comprises a control unit that protrudes toward the front cover from an outer edge of the lens mounting unit, and the control unit and the second guide unit are concentrically formed relative to each other, wherein the control unit is formed on an outer edge of the second guide unit by being separated from the second guide unit.

6. The surveillance camera of claim 5, wherein the control unit comprises a first stopper that extends toward the second protrusion unit on an edge thereof and the second protrusion unit comprises a second stopper that extends toward the control unit on an edge thereof.

7. The surveillance camera of claim 1, wherein a lubricant is coated between the outer surface of the first guide unit 122 and the inner surface of the first protrusion unit.

8. The surveillance camera of claim 1, wherein the lens unit is combined with an inner surface of the first guide unit.

9. A surveillance camera comprising:
a main body casing;
a front cover that forms a camera housing by being combined with the main body casing;
a lens mounting unit that combines with or detaches from the front cover by rotating the lens mounting unit with respect to the front cover;
a fixing lever configured to the lens mounting unit; and
a lens unit that is combined with the lens mounting unit,
wherein the lens mounting unit comprises a first guide unit to which the lens unit is combined and a second guide unit that is separated from the first guide unit and adjusts a back focus length (BFL) by moving the lens mounting unit in an optical axis direction,
wherein the front cover comprises a first protrusion unit that prevents an image blurring phenomenon caused by tilting of the lens mounting unit by contacting an outer surface of the first guide unit and a second protrusion unit that contacts the second guide unit,
wherein the first protrusion unit and the second protrusion unit are concentrically formed on a front surface of the front cover without contacting each other, and the second protrusion unit is formed on an outer side of the first protrusion unit,
wherein the first guide unit and the second guide unit are concentrically formed on a rear surface of the lens mounting unit without contacting each other, and the second guide unit is formed on an outer side of the first guide unit,
wherein the front surface of the front cover and the rear surface of the lens mounting unit is disposed to face each other, and
wherein the fixing lever is configured to be screwed into a screw hole formed on the second guide unit such that the lens mounting unit is fixed by an end of the fixing lever pressing an outer surface of the second protrusion unit.

10. The surveillance camera of claim 9, wherein screw threads are formed on surfaces where the second guide unit contacts the second protrusion unit.

11. The surveillance camera of claim 10, wherein the second guide unit is formed on an outer edge of the first guide unit and an elastic body is located between the first protrusion unit and the second guide unit.

12. The surveillance camera of claim 11, wherein upper surfaces of the screw threads formed on the second guide unit contact lower surfaces of the screw threads formed on the second protrusion unit.

13. The surveillance camera of claim 9, wherein a lubricant is coated between the first guide unit and the first protrusion unit.

14. The surveillance camera of claim 9, wherein the first protrusion unit, the second protrusion unit, the first guide unit, and the second guide unit are concentrically formed relative to each other.

15. The surveillance camera of claim 9, wherein the lens mounting unit further comprises a control unit that protrudes toward the front cover from an outer edge of the lens mounting unit, wherein the control unit is formed on an outer edge of the second guide unit by being separated from the second guide unit.

16. The surveillance camera of claim 15, wherein the control unit comprises a first stopper that extends toward the second protrusion unit on an edge of the control unit and the second protrusion unit comprises a second stopper that extends toward the control unit on an edge of the second protrusion unit.

* * * * *